Patented Oct. 7, 1941

2,257,899

UNITED STATES PATENT OFFICE 2,257,899

MANUFACTURE OF GLYCEROL MONOCHLOROHYDRIN

Edgar C. Britton and Harold R. Slagh, Midland, Mich., assignors to The Dow Chemical Company, Midland, Mich., a corporation of Michigan No Drawing. Application April 26, 1937, Serial No. 138,935

3 Claims. (Cl. 260—633)

This invention relates to improvements in the manufacture of glycerol monochlorohydrin by the reaction of glycerol with hydrogen chloride.

The synthesis of glycerol monochlorohydrin by reaction of glycerol with hydrogen chloride was first reported by Berthelot (Ann. 88, 311). The reaction may be represented by the following equation:

(1) 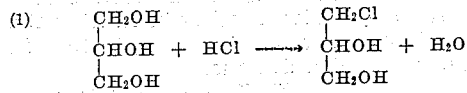

In usual practice, as summarized by G. P. Gibson (Chem. and Ind. 50, 949), the reaction proceeds in the presence or absence of a catalyst, such as acetic acid, with formation of considerable glycerol dichlorohydrin, as well as the desired glycerol monochlorohydrin product. This glycerol dichlorohydrin is formed at the expense of the glycerol monochlorohydrin, as indicated by the following equation:

(2) 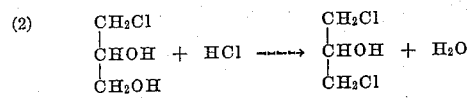

We have discovered that such formation of glycerol dichlorohydrin may be repressed, and even entirely prevented, by carrying the reaction between hydrogen chloride and glycerol out in the presence of a non-aqueous reaction solvent miscible with glycerol and glycerol monochlorohydrin at the reaction temperature and unreactive with hydrogen chloride. We have also found that by operating in such manner the yield of glycerol monochlorohydrin may be increased materially. The invention, then, consists in the improved method of manufacturing glycerol monochlorohydrin hereinafter fully described and particularly pointed out in the claims.

In preparing glycerol monochlorohydrin according to the invention, the reaction of glycerol with anhydrous or aqueous hydrogen chloride is carried out as usual, except that an inert solvent is added to the reaction mixture prior to or during the reaction. A non-aqueous reaction solvent which does not react with hydrogen chloride and in which glycerol and glycerol monochlorohydrin are both soluble at the reaction temperature is required. Examples of such solvents are glycerol dichlorohydrin, dioxane, phenol, cresol, etc. The formation of glycerol dichlorohydrin is repressed regardless of the proportion of such solvent added, but for practical reasons the solvent is usually added in amount representing between 30 and 70 per cent of the weight of the glycerol employed. The reaction occurs smoothly and rapidly when carried out at temperatures between 80° and 130° C. in the presence of a catalyst, but it may be carried out at other temperatures and in the absence of catalysts, if desired. Glacial acetic acid is ordinarily employed to catalyze the reaction, but other acids such as propionic acid, butyric acid, oxalic acid, sulphuric acid, etc., may be used instead. Ordinarily, between 0.01 and 0.03 mol of catalyst is employed per mol of glycerol, but the catalyst may of course be employed in other proportions.

In practice, a mixture of one part by weight of glycerol, between 0.3 and 0.7 part of solvent, and approximately 0.01 part of glacial acetic acid is heated to a temperature between 80° and 130° C., preferably between 95° and 110° C., and gaseous hydrogen chloride is passed into the heated mixture until the weight of the latter is increased by approximately 25–33 per cent. The mixture is then blown with air or otherwise treated to remove the dissolved hydrogen chloride, after which it is fractionally distilled to separate the glycerol monochlorohydrin, glycerol dichlorohydrin, if formed during reaction, solvent, and unreacted glycerol. The recovered glycerol, solvent, and hydrogen chloride may be, of course, re-employed in subsequent reactions. By operating in such manner, glycerol monochlorohydrin may be manufactured in greater than 95 per cent of the theoretical yield and as substantially the only chlorohydrin product from the reaction.

The attached table shows the results obtained in four comparative experiments which illustrate the advantages of the invention. Run 1 of the table was carried out in the absence of added solvent, and is submitted for purpose of comparison with runs 2, 3, and 4 each of which was carried out in the presence of added solvent as required by the invention. In runs 2 and 3 the solvent employed was glycerol dichlorohydrin and in run 4 it was dioxane. In each run, the "initial mixture," defined by the table, was heated to 100° C. and gaseous hydrogen chloride was passed thereinto during the entire reaction period stated in the table, some water being permitted to distill from the mixture during such treatment. The mixture was then blown with air to remove dissolved hydrogen chloride therefrom, after which it was fractionally distilled. The table gives the quantities of glycerol, glycerol monochlorohydrin, and glycerol dichlorohydrin collected during the distillation and states the per cent yields of glycerol monochlorohydrin and glycerol dichlorohydrin, based on the glycerol consumed in the reaction. The yields of glycerol dichlorohydrin stated in runs 2 and 3 of the table represent the glycerol dichlorohydrin formed during the reaction. The quantity of glycerol dichlorohydrin formed in the reaction is, of course, the difference between the quantity of glycerol dichlorohydrin initially present in the reaction mixture and that recovered after completion of the reaction.

Other modes of applying the principle or our invention may be employed, change being made as regards the method herein disclosed, provided the method stated in any of the following claims or the equivalent of such stated method be employed.

We therefore particularly point out and distinctly claim as our invention:

1. In the manufacture of glycerol monochlorohydrin by the reaction of hydrogen chloride with glycerol, the improvement which consists in heating the reaction mixture at a reaction temperature in the presence of an added non-aqueous reaction solvent miscible with glycerol and glycerol monochlorohydrin at the reaction temperature and unreactive chemically with the reactants and reaction products under reaction conditions.

2. A process according to claim 1 wherein the added solvent is glycerol dichlorohydrin.

3. In the manufacture of glycerol monochlorohydrin by reaction of hydrogen chloride with glycerol, the step which consists in heating the reaction mixture at a reaction temperature in the presence of added dioxane.

EDGAR C. BRITTON.
HAROLD R. SLAGH.

*Table I*

| Run No. | Initial mixture | | | Time of reaction | Product | | | Yields | |
|---|---|---|---|---|---|---|---|---|---|
| | Glycerol | Acetic acid | Solvent | | Glycerol monochlorohydrin | Glycerol dichlorohydrin | Glycerol | Glycerol monochlorohydrin | Glycerol dichlorohydrin |
| | Gram-mols | Gram-mols | Gram-mols | Hours | Gram-mols | Gram-mols | Gram-mols | Per cent | Per cent |
| 1 | 2.48 | .0433 | 0 | 7.0 | 1.81 | 0.374 | 0.276 | 82.2 | 17.0 |
| 2 | 2.48 | .0433 | ¹0.74 | 7.5 | 1.67 | 0.814 | 0.734 | 95.3 | 4.2 |
| 3 | 2.48 | .0438 | ¹1.01 | 6.0 | 1.955 | 0.974 | 0.482 | 97.8 | 0.0 |
| 4 | 2.48 | .0438 | ²1.98 | 11.5 | 1.93 | 0.131 | 0.482 | 96.6 | 6.5 |

¹ Glycerol dichlorohydrin.
² Dioxane.